United States Patent [19]
Kawano

[11] Patent Number: 5,339,112
[45] Date of Patent: Aug. 16, 1994

[54] AUTOMATIC PHASE CONTROLLING CIRCUIT FOR PROCESSING REPRODUCED CHROMA SIGNALS

[75] Inventor: Mitsumo Kawano, Saitama, Japan

[73] Assignee: Kabushiki Kaisha Toshiba, Kawasaki, Japan

[21] Appl. No.: 985,913

[22] Filed: Dec. 4, 1992

[30] Foreign Application Priority Data

Dec. 10, 1991 [JP] Japan .................. 3-326020

[51] Int. Cl.⁵ ............................... H04N 9/02
[52] U.S. Cl. ................... 348/549; 348/539
[58] Field of Search ............ 358/337, 40, 38, 320, 358/326, 324, 328, 17, 19, 149, 21, 4; 331/25, 18; 348/536, 549, 537, 539; H04N 9/02, 9/79, 9/87

[56] References Cited

U.S. PATENT DOCUMENTS

| | | | |
|---|---|---|---|
| 3,629,491 | 12/1971 | Dann et al. | |
| 4,009,450 | 2/1977 | Holcomb et al. | |
| 4,010,490 | 3/1977 | Ota | 358/4 |
| 4,023,115 | 5/1977 | Nicolas | |
| 4,145,705 | 3/1979 | Yoshinaka | |
| 4,170,023 | 10/1979 | Yamakosh et al. | 358/19 |
| 4,178,606 | 12/1979 | Hirota | |
| 4,631,600 | 12/1986 | Fukui | 358/320 |
| 4,684,901 | 8/1987 | Kawano | 331/25 |
| 4,758,879 | 7/1988 | Matthies | 358/19 |
| 5,083,213 | 1/1992 | Yasuda | 358/326 |

FOREIGN PATENT DOCUMENTS

| | | |
|---|---|---|
| 0360230 | 3/1990 | European Pat. Off. |
| 0122291 | 7/1984 | Japan .............. H04N 9/02 |
| 1476984 | 6/1977 | United Kingdom |

Primary Examiner—Victor R. Kostak
Assistant Examiner—Nathan J. Flynn
Attorney, Agent, or Firm—Cushman, Darby & Cushman

[57] ABSTRACT

A low range chroma signal reproduced from a recording medium is converted in the frequency by a frequency converter to obtain an original carrier chroma signal, then the carrier chroma signal is passed through a comb filter for removing a crosstalk and is output further through a phase shifting circuit, a burst signal of the phase shifting output is compared in the phase with a reference signal, the phase comparing output is smoothed by a filter, is then fed to a controlling terminal of a variable oscillator to control the oscillating frequency and is fed to a controlling terminal of the above mentioned phase shifting circuit to control the phase shifting amount. In this formation, a sub-APC loop including no comb filter is superimposed on a conventional APC loop and a response can be made until a high frequency. A color irregularity in a high frequency range (high range phase fluctuation of a carrier chroma signal) which has not been able to be removed can be reduced.

12 Claims, 6 Drawing Sheets

AUTOMATIC PHASE CONTROLLING CIRCUIT FOR PROCESSING REPRODUCED CHROMA SIGNALS

BACKGROUND OF THE INVENTION

1. Field of the Invention

This invention relates to a reproduced chroma signal processing automatic phase controlling circuit to be used for a circuit reproducing an original carrier chroma signal from a low range converted chroma signal reproduced from a magnetic tape in a VTR (Video Tape Recorder) or the like.

2. Description of the Related Art

In a domestic VTR, a chroma signal is converted in the frequency to be in a low range and is recorded on a magnetic tape. In the reproduction, on the contrary, the low range chroma signal is converted in the frequency to the original carrier chroma signal and is reproduced. Here, an NTSC system television signal shall be explained.

In the recording, a carrier chroma signal is separated and extracted from a compound video signal and is multiplied by a local signal of a predetermined frequency to obtain a carrier chroma signal converted in the frequency to be in a low range. This low range converted chroma signal is recorded as mixed with a luminance signal separated and extracted from the compound video signal and modulated in the frequency. In the reproduction, the reproduced low range chroma signal is multiplied by the output of a local oscillator of a predetermined frequency controlled by an automatic phase controlling (abbreviated as APC hereinafter) circuit to obtain a chroma signal having the original carrier frequency. An APC circuit compares the phase of a chroma burst signal of a chroma signal, returned to its original frequency, to a reference signal. The APC circuit also controls a local oscillator, used for altering the frequency of the low range chroma signal, in accordance with the output of the comparison to maintain frequency and phase of the output chroma signal in agreement with the frequency and phase of the reference signal to remove a time-axis fluctuating component of the reproduced chroma signal.

If guard-bandless recording is performed with no guard band (space area) between adjacent tracks in order to achieve high density recording, crosstalk from the adjacent tracks is generated during reproduction of the chroma signal. An azimuth recording system is normally used to perform such guard-bandless recording. In this azimuth recording system, however, because an azimuth signal which is converted to a low range frequency has low azimuth loss, crosstalk from the adjacent tracks can be generated and appears on an image plane as noise. Therefore, in the recording, the chroma signal is recorded with the phase displaced so that the crosstalk component of the reproduced chroma signal may be inverted in the phase in each horizontal scanning period and the crosstalk component is removed by passing the chroma signal through a comb filter at the time of the reproduction. As an example of this recording system, there is a chroma phase shifting system (PS system) in the VHS (Video Home System). In this PS system, the low range chroma subcarrier frequency is selected to be $\frac{1}{4}$ integral times (($\frac{1}{4}$)×80 times) horizontal frequency(=629 kHz) and the phase of the chroma signal is recorded as shifted by 90 degrees in each horizontal period (1H). At the time of the reproduction, the phase of the chroma signal is recovered in 1H, the subcarrier frequency is returned to the origin, the present carrier chroma signal and the 1H delayed and inverted carrier chroma signal are superimposed on each other by using a comb filter using a 1H delay line and the crosstalk component is canceled to obtain only the chroma signal component from the reproducing track.

Such chroma signal processing APC circuit and chroma crosstalk removing recording and reproducing system as in the above are shown, for example, in U.S. Pat. No. 4,178,606.

FIG. 6 shows an APC loop of a color reproducing circuit used for a conventional VHS system VTR. FIGS. 7 and 8 show respectively formation examples of a comb filter 4 and APC detector 7 in FIG. 6. In FIG. 6, a reproduced low range converted chroma signal (of 629 KHZ) from a magnetic tape is input into an input terminal 1 and is fed to a frequency converter 2 in which the input low range chroma signal is multiplied by a local signal (of 4.2 MHZ) obtained by dividing the frequency of an oscillated signal from a voltage controlled oscillator (abbreviated as VCO hereinafter) 9 and having the phase displaced by 90 degrees per H so as to be the original carrier chroma signal of 3.58 MHZ. This carrier chroma signal has only the component of 3.58 MHZ extracted through a band pass filter (BPF) 3, further has the crosstalk component canceled through a comb filter 4 and is led out to an output terminal 5.

In the comb filter 4, as shown in FIG. 7, a carrier chroma signal (output of BPF 3) of 3.58 MHZ including a crosstalk is input into an input terminal 41, is delayed by 1H by a 1H delaying line 42, is then inverted by an inverting circuit 43 and is fed to one input end of an adder 44. A carrier chroma signal before the 1H delay from the input terminal 41 is input as it is into the other input end of the adder 44, which combines the above mentioned 1H delayed and inverted carrier chroma signal and outputs to an output terminal 45 (that is, the above mentioned output terminal 5) as a carrier chroma signal of 3.58 MHZ having the crosstalk removed.

On the other hand, the carrier chroma signal output from the comb filter 4 is fed to an APC detector 7.

In the APC detector 7, as shown in FIG. 8, a carrier chroma signal (output of the comb filter 4) of 3.58 MHZ is input into an input terminal 71 and a burst signal is extracted from the carrier chroma signal by a burst gate circuit 72. The burst signal extracted by the burst gate circuit 72 is compared in the phase with a reference signal (output of a crystal oscillator 6) from an input terminal 73 in a phase detector 74 and is output as a phase detecting output from an output terminal 75.

In the APC detector 7, the burst part of the output of the comb filter 4 is compared in the phase with the reference signal of the crystal oscillator 6. The phase comparing output is smoothed by the filter 8 and is then fed to an oscillation controlling terminal of the VCO 9. The output of the VCO 9 is divided in the frequency by the frequency divider 10, then the phase is shifted by 90 degrees per H by the phase shifter 11 and is fed to the above mentioned frequency converter 2 as a local signal (of 4.2 MHZ).

In such formation, if a phase fluctuation occurs in the carrier chroma signal of 3.58 MHZ output from the comb filter 4, the phase difference from the reference signal will be output as a phase detecting output from the APC detector 7. The phase detecting output from the APC detector 7 delays by the phase difference the phase of the oscillated frequency of the VCO 9 so that the carrier chroma signal output from the comb filter 4 may be controlled to be of the frequency and phase of the reference signal.

Here, when the phase of the low range converted chroma signal reproduced from a magnetic tape is represented by $\phi c$ and the phase of the local signal fed back so as to be multiplied to it is represented by $\phi o$, on the phase of this APC loop, the closed loop gain $G(s) = \phi o/\phi c$ shall be determined. When the phase detection sensitivity(=output voltage variation/phase difference variation) of the phase detector within the APC detector 7 is represented by $\mu$, the control sensitivity(=frequency variation/controlling voltage variation) of the circuit part composed of the VCO 9 and the frequency divider 10 is represented by $\beta$ and the characteristic of the filter 8 is represented by F(s), it will be given by $$G(s) = \left(\frac{2\pi}{s}\right) \cdot \beta \cdot \mu \cdot M(s) \cdot H(s) \cdot F(s) \qquad (1)$$

wherein $s = j\,\omega(=j2\pi f)$ and M(s) represents the characteristic of the comb filter 4. When the period of 1H is represented by TH, it will be $$M(s) = \frac{1 + \exp(-TH \cdot s)}{2}. \qquad (2)$$

H(s) represents a sample holding effect produced for the APC detection of the burst part of each H and is $$H(s) = \frac{1 - \exp(-TH \cdot s)}{TH \cdot s}. \qquad (3)$$

If the characteristic F(s) of the filter 8 is flat until the high range, it will be simplified as F(s)=1 and, if the formulae (2) and (3) are substituted in the formula (1), $$G(s) = 2\pi \cdot \beta \cdot \mu \cdot \left(\frac{1 - \exp(-2TH \cdot s)}{2TH \cdot s}\right) \cdot \frac{1}{s} \qquad (4)$$

In a sufficiently low frequency, as $$\exp(-2TH \cdot s) \approx 1 - 2TH \cdot s,$$

this is similar to $$\begin{aligned} G(s) &= 2\pi \cdot \beta \cdot \mu \cdot \frac{1}{s} \\ &= -j\left(\frac{\beta \cdot \mu}{f}\right), \end{aligned} \qquad (5)$$

becomes a negative imaginary number value and has a phase of about $-90$ degrees. When the frequency becomes high, this phase will further delay. When $s = j \cdot (\pi/2) \cdot fH$ (wherein $fH = 1/TH$ and $fH = 15.75$ kHZ), that is, when the frequency $f = (\frac{1}{4}) \cdot fH$, if $s = j \cdot \pi/(2TH)$ is substituted in the formula (4), G(s) will become a negative real number of $$G(s) = -\left(\frac{8 \cdot \beta \cdot \mu \cdot TH}{\pi}\right) \qquad (6)$$

and the phase will become $-180$ degrees (that is, the same phase) and will become a positive feedback. Therefore, here the gain must be set to be smaller than 1. Reversely speaking, the response of the APC loop can not be made more than $(\frac{1}{4}) \cdot fH$. In fact, in order to keep the APC loop system stable, only a lower frequency response can be made.

This frequency response can be extended to a higher range with the comb filter 4 deleted but can not be adopted unless, for example, the crosstalk part is substantially nil and therefore is not general.

As mentioned above, the response of the APC loop of the color reproducing circuit in the VTR, can not be made until a high frequency and therefore there has been a problem that a color irregularity remains on the picture.

SUMMARY OF THE INVENTION

An object of the present invention is to provide a reproduced chroma signal processing automatic phase controlling circuit favorable in the frequency response until a high frequency range.

Another object of the present invention is to provide a reproduced chroma signal processing automatic phase controlling circuit wherein no color irregularity remains on the picture in the color reproduction of a VTR.

The automatic phase controlling circuit for processing reproduced chroma signals by the present invention is characterized by comprising:

a frequency converting means for converting a low range converted chroma signal reproduced from a recording medium to a carrier chroma signal by using a local signal;

a comb filter for removing a crosstalk component from the carrier chroma signal output from this frequency converter;

a phase shifting means for shifting the phase of the carrier chroma signal from this comb filter in response to a controlling signal;

a variable oscillating means for making the oscillated frequency variable in response to the controlling signal and oscillating a local signal to be used in said frequency converting means; and a phase detecting means for comparing in the phase a color burst signal of the output of said phase shifting means with a predetermined reference signal, controlling the oscillated frequency of said variable oscillating means by using the phase comparing output as a controlling signal and controlling, on the other hand, the phase shifting amount of said phase shifting means.

In the present invention, the frequency response of an APC loop is made possible until a high frequency by superimposing a sub-APC loop (of a phase shifting means, phase detecting means and amplifier) including no comb filter on a conventional APC loop (comprising a frequency converting means, comb filter, phase detecting means and variable oscillating means).

DETAILED DESCRIPTION OF THE PREFERRED EMBODIMENTS

Figure 1:
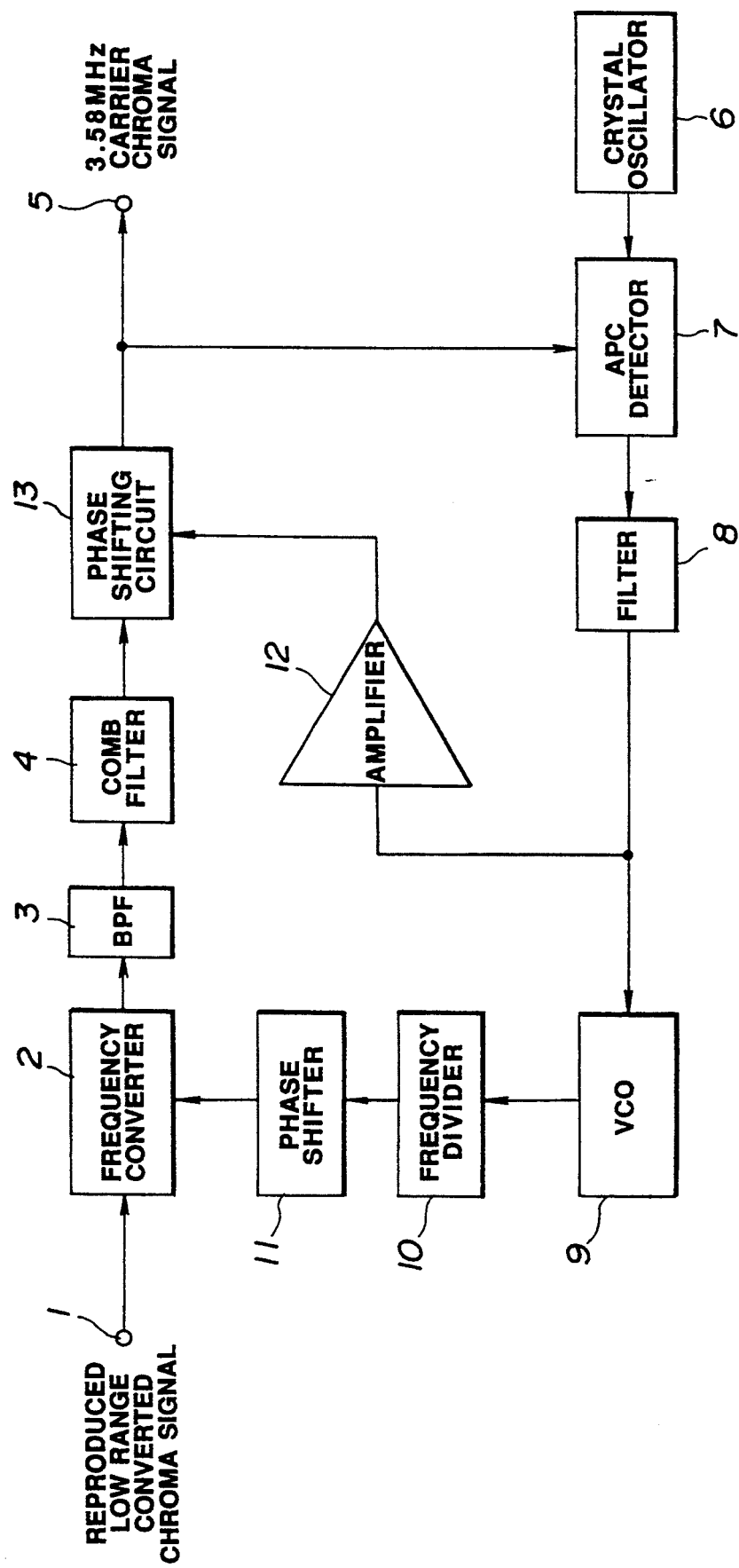
FIG. 1 is a block diagram showing a reproduced chroma signal processing automatic phase controlling circuit embodying the present invention.

FIG. 1 is a block diagram showing a reproduced chroma signal processing automatic phase controlling circuit embodying the present invention.

In FIG. 1, a low range converted chroma signal reproduced from a magnetic tape and having the phase shifted in each H is input into an input terminal 1 and is fed to a frequency converter 2 in which the input low range converted chroma signal is multiplied by a local signal (of 4.2 MHZ) having its frequency divided by an oscillated signal from a VCO 9 and having its phase displaced by 90 degrees in each H so as to be a carrier chroma signal of 3.58 MHZ in which the phase in each H is returned to the original. This carrier chroma signal has only a component of 3.58 MHZ extracted through the band pass filter (BPF) 3, is superimposed on a carrier chroma signal delayed by 1H and inverted in the comb filter 4, has the crosstalk part canceled and is then further output from the output terminal 5 through a phase variable phase shifting circuit 13.

Figure 7:
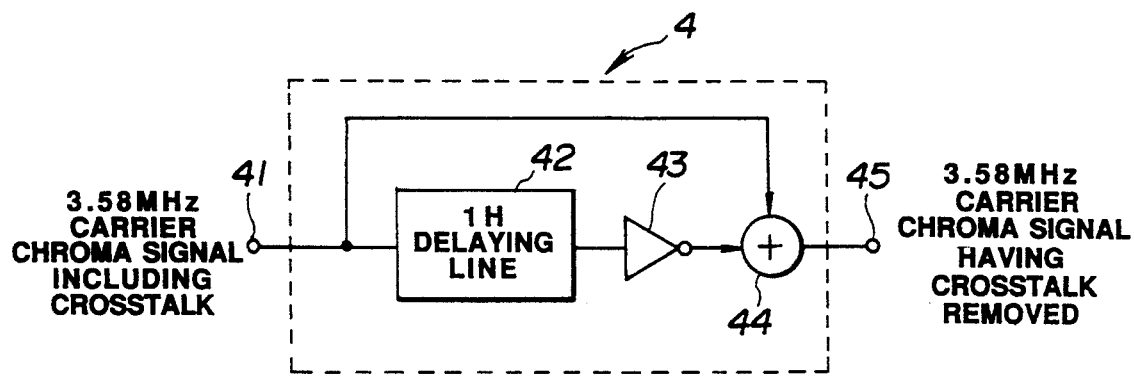
FIG. 7 is a block diagram showing a formation example of a comb filter.

The comb filter 4 is of the same formation as is shown in FIG. 7 and comprises a 1H delaying line, inverter and adder.

Figure 6:
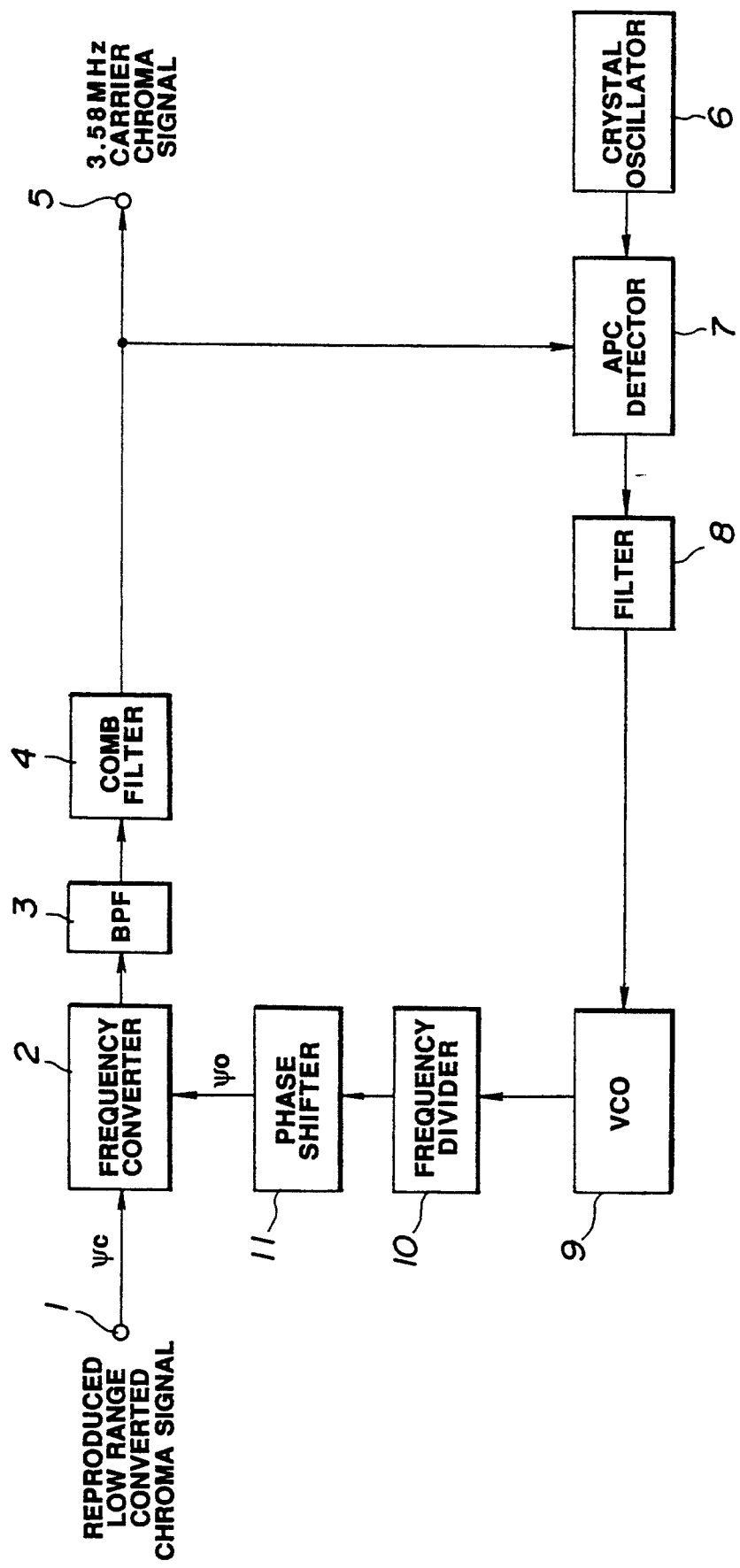
FIG. 6 is a block diagram showing a conventional automatic phase controlling circuit for processing reproduced chroma signals.
Figure 8:
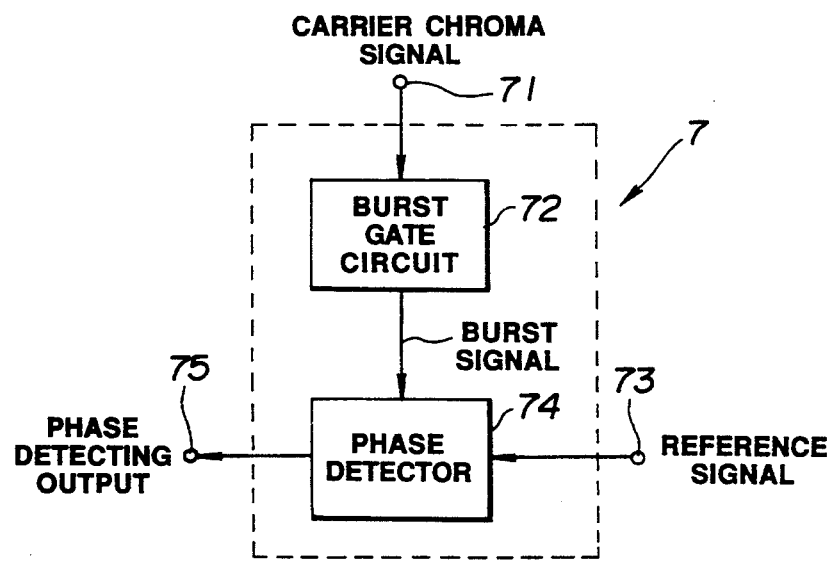
FIG. 8 is a block diagram showing a formation example of an APC detector.

The output of the above mentioned phase shifting circuit 13 is also fed to the APC detector 7 comprising a burst gate circuit for extracting a burst signal from the carrier chroma signal and a phase detector for comparing the phase of the extracted burst signal with a reference signal from a crystal oscillator 6 as shown in FIG. 8. In the APC detector 7, the phase of the burst part of the output of the phase shifting circuit 13 is compared with the reference signal of the crystal oscillator 6. The phase comparing output is smoothed by a filter 8, is then fed to an oscillation controlling terminal of the VCO 9 and is also fed to a phase shift controlling terminal of the above mentioned phase shifting circuit 13 through an amplifier 12. The frequency of the output of the above mentioned VCO 9 is divided by a frequency divider 10, its phase is then shifted by 90 degrees in each H by the phase shifter 11 and it is fed to the above mentioned frequency converter 2 as the local signal (of 4.2 MHZ). In the above formation, a sub-APC loop is newly superimposed on the APC loop of the conventional example (FIG. 6). This sub-APC loop comprises the phase shifting circuit 13, APC detector 7, filter 8 and amplifier 12 but includes no comb filter which is a delaying element.

In such formation, when the carrier chroma signal of 3.58 MHZ having passed through the comb filter 4 fluctuates in the phase, a phase difference from the reference signal will be output from the APC detector 7 as a phase detecting output. The phase detecting output from the APC detector 7 controls the phase of the oscillated frequency of the VCO 9 to be delayed by the above mentioned phase difference and at the same time controls the phase shifting amount of the phase shifting circuit 13 to be delayed by the above mentioned phase difference so that the carrier chroma signal output from the output terminal 5 may be controlled to be of the frequency and phase of the reference signal.

The closed loop gain G(s) on the phase of the above mentioned APC loop system shall be determined in the following. It is an addition of the sub-APC loop gain to the conventional APC loop gain. When the control sensitivity(=phase variation/control voltage variation) of the phase shifting circuit 13 is represented by P and the gain of the amplifier 12 is represented by A, $$G(s) = \mu \cdot H(s) \cdot F(s) \cdot \left\{ \left( \frac{2\pi}{s} \right) \cdot \beta \cdot \bar{M}(s) + A \cdot P \right\} \quad (7)$$

$$= \mu \cdot F(s) \cdot \left[ 2\pi \cdot \beta \cdot \left\{ \frac{1 - \exp(-2TH \cdot s)}{2TH \cdot s} \right\} \cdot \frac{1}{s} + A \cdot P \cdot \left\{ \frac{1 - \exp(-TH \cdot s)}{TH \cdot s} \right\} \right].$$

It is the same as in the conventional example that the first term of this formula (7) will become a negative real number to be a positive feedback when $s = j \cdot (\pi/2) \cdot fH$, that is, $f = fH/4$. But the second term will not become a negative real number until when $s = j \cdot (2\pi) \cdot fH$, that is, $f = fH$ where this term becomes 0. That is to say, the response of the APC loop will be possible until a considerably higher frequency than in the conventional example.

Here, the first term and second term of the formula (7) shall be compared in the size with each other. If, for brevity, the comb characteristic part M(s) is represented by "1" and $|s| = 2\pi$ f, except the common terms, the first term will be $\beta/(8$ f) but the second term will be A·P. Generally, the value of P is of a size of substantially $\beta$/fo and fo is a center oscillated frequency of the VCO 9 and is of a size in the order of MHZ. On the other hand, the frequency f of the first term is on the level of several kHZ. Therefore, unless the amplifier gain A of the second term is considerably large, there will be no effect as of the second term. Therefore, in order to enlarge the amplifier gain A, it is practical to put means for cutting a direct current component in the input step of the amplifier. By using this means, the gain in the low range may drop but the frequency response in the high range (of several kHZ to several ten kHZ) can be made favorable and therefore there is no problem.

Figure 2:
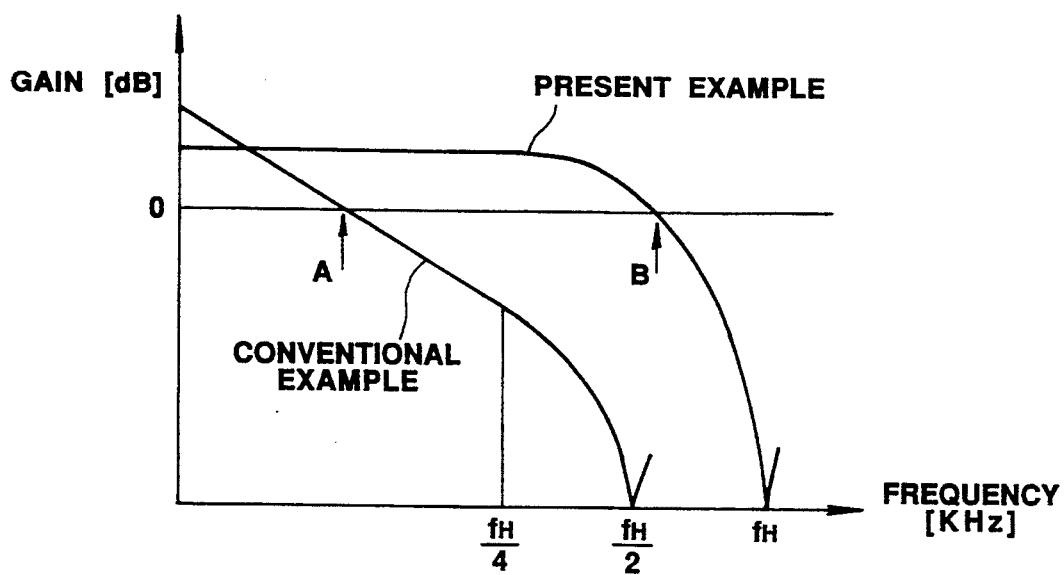
FIG. 2 is a frequency characteristic diagram showing a gain characteristic of an APC loop.

The gain characteristic of the APC loop is shown in FIG. 2 in which the frequency f of the fluctuation is taken on the abscissa and the gain is taken on the ordinate. FIG. 2 shows the frequency characteristic of the APC loop gain shown by the above mentioned formula (7) as divided into the first term part (the conventional example) and, the first term and second terms part (this embodiment). As described above, only up to the frequency A point considerably lower than $f = fH/4$ has been able to be responded but, in this embodiment, the responding range can be pulled up to the high range frequency B point near to f=fH.

Figure 3:
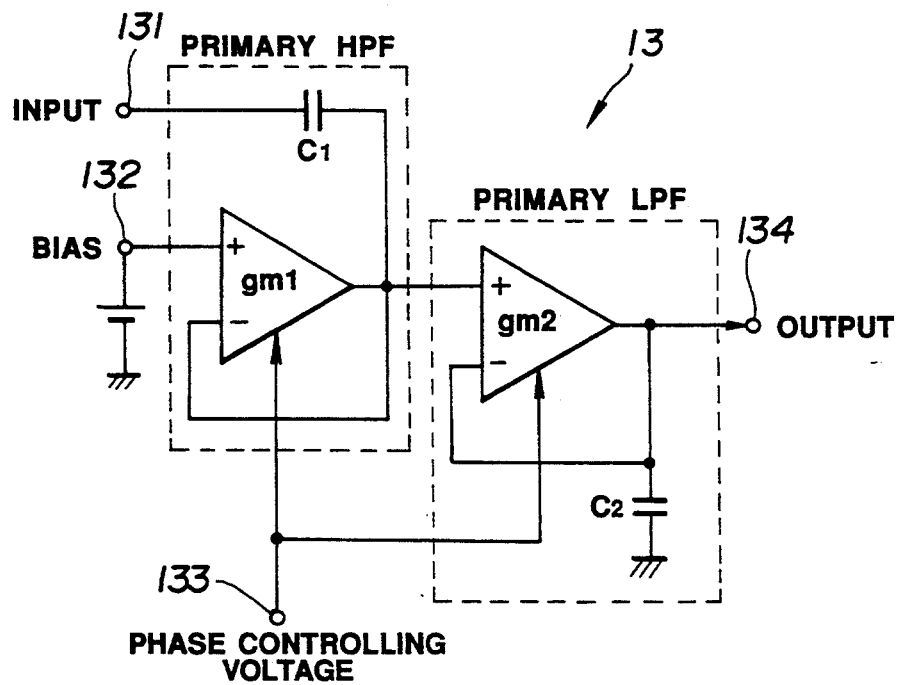
FIG. 3 is a circuit diagram showing an example of a phase shifting circuit.

FIG. 3 is a circuit diagram showing an example of the above mentioned phase shifting circuit 13. And FIG. 4 is an equivalent circuit diagram of FIG. 3.

In FIG. 3, by using variable mutual conductances gm1 and gm2 formed of variable current amplifiers by a differential amplifying circuit and making them variable with a phase controlling voltage fed to the input terminal 131, the phase of the carrier chroma signal input into the input terminal 131 can be shifted. A bias voltage is fed to the +input terminal 132 of the conductance gm1, the other end of the load condenser C1 connected at one end to the output terminal of the conductance gm1 is made a carrier chroma signal input terminal 131, the output of the conductance gm1 is fed back to the −input terminal of the conductance gm1 and is fed to the +input terminal of the conductance gm2, the other end of the load condenser C2 connected at one end to the output terminal of the conductance gm2 is connected to the reference potential point and the output of the conductance gm2 is fed back to the −input terminal of the conductance gm2 and is on the other hand led out to the output terminal 134. Such formation can be paraphrased to connect in series a primary high pass filter (HPF) and a primary low pass filter (LPF). It can be set to show the characteristic of a band pass filter of a wide band and operates on a chroma signal as a phase shifter.

Figure 4:
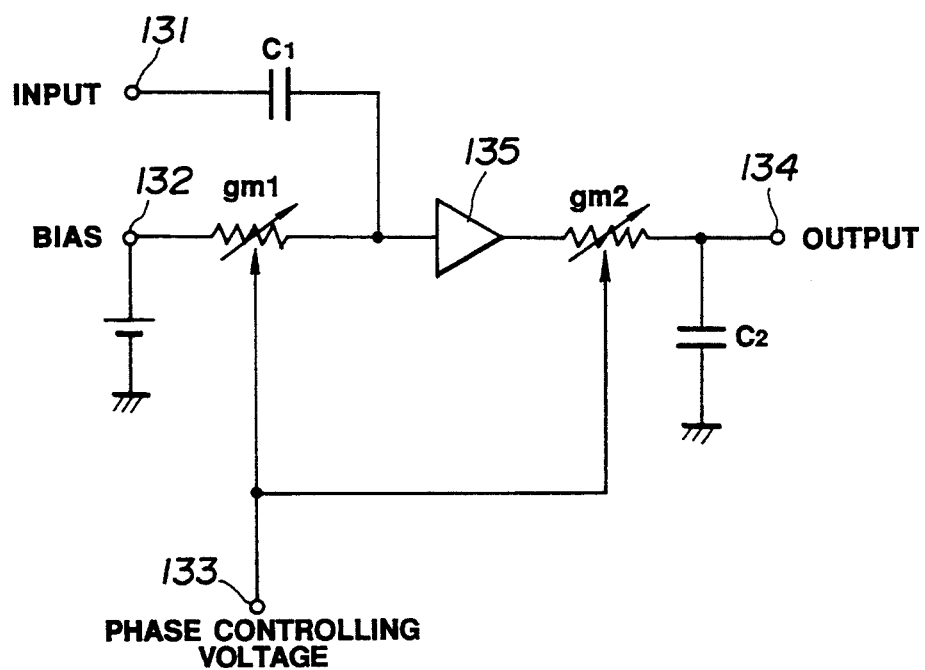
FIG. 4 is an equivalent circuit diagram of FIG. 3.

As shown in FIG. 4, the circuit shown in FIG. 3 is equivalent to a circuit formation in which the variable mutual conductances gm1 and gm2 are replaced with variable resistances and the respective variable resistance values are controlled by a phase controlling voltage. In FIG. 4, reference numeral 135 shows buffer.

In the embodiment in FIG. 1, the sub-APC loop (comprising the phase shifting circuit 13, APC detector 7, filter 8 and amplifier 12) including no comb filter is superimposed on the conventional main APC loop (comprising the frequency converter 2, comb filter 4, APC detector 7, filter 8, VCO 9, frequency divider 10 and phase shifter 11) and the APC detector 7 and filter 8 are used in common in both APC loops, but the loop gain can be set separately in each APC loop in the following.

Figure 5:
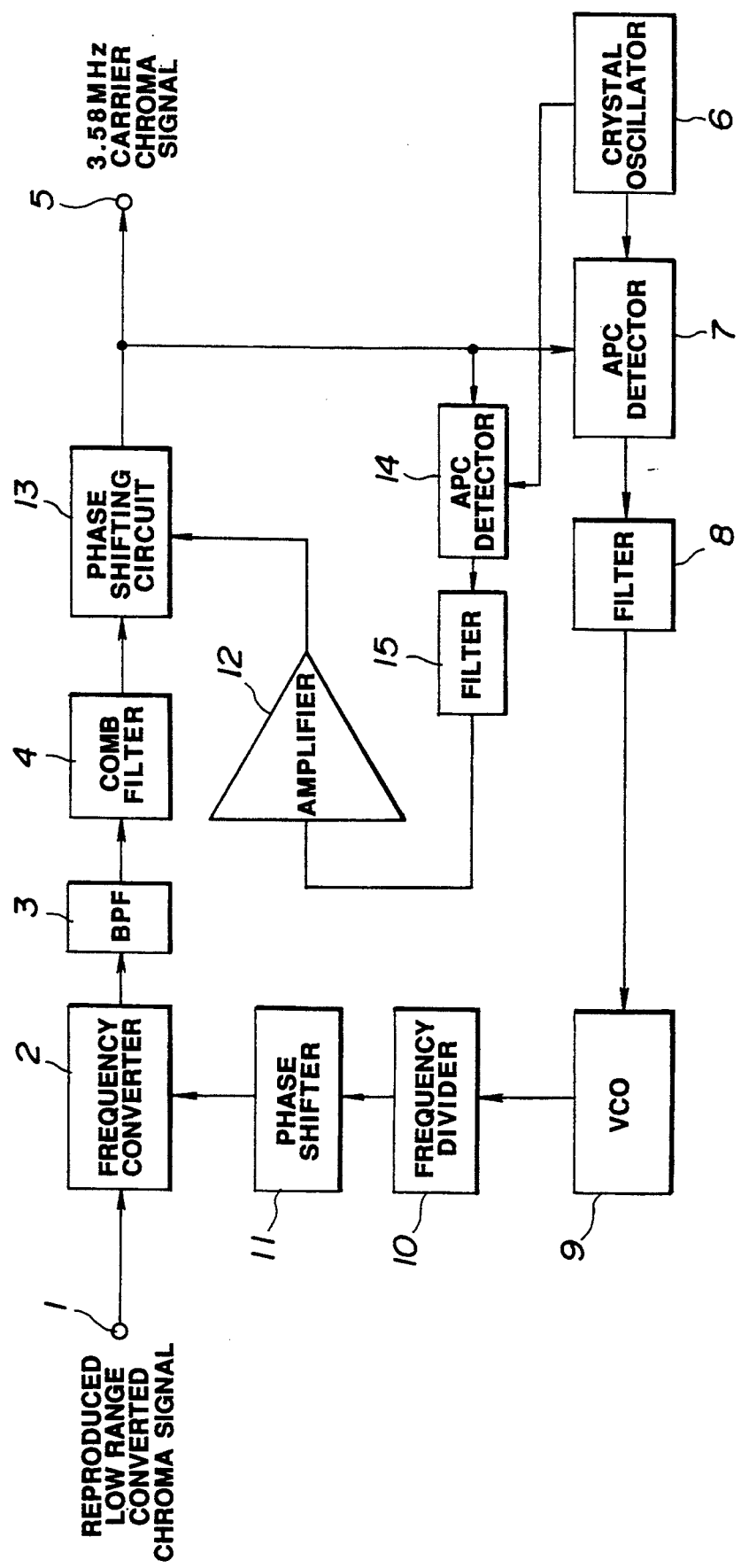
FIG. 5 is a block diagram showing a reproduced chroma signal processing automatic phase controlling circuit of another embodiment of the present invention.

FIG. 5 is a block diagram showing a reproduced chroma signal processing automatic phase controlling circuit of another embodiment of the present invention.

In the embodiment in FIG. 5, each of the above mentioned main APC loop and sub-APC loop is provided with the APC detector and smoothing filter. That is to say, in the sub-APC loop, the carrier chroma signal output from the phase shifting circuit 13 is input into the APC detector 14, the burst part is taken out of the carrier chroma signal here and is compared in the phase with the reference signal from the crystal oscillator and the phase comparing output is smoothed by the filter 15 and is then fed to the phase shift controlling terminal of the phase shifting circuit 13 through the amplifier 12. The other formations are the same as in FIG. 1. The APC detector 14 is of the same formation as in FIG. 8. The filter 15 is formed of a low pass filter (LPF).

When thus the APC detector 14 and filter 15 exclusively for the sub-APC loop are provided, it will be easy to set a loop gain for each APC loop and, if the phase detecting sensitivity of the APC detector 14 is elevated, the gain of the amplifier 12 will be able to be lowered to the advantage of designing the circuit.

As described above, according to the present invention, the sub-APC loop including no comb filter is provided as superimposed on the APC loop, therefore the response of the APC loop can be extended to a high frequency and the color irregularity in the high frequency range which has not been able to be removed can be reduced.

The present invention is not limited to only the above mentioned embodiments but various modifications can be made in the range not deviating from the subject matter of the invention.

What is claimed is:

1. An automatic phase controlling circuit for processing reproduced chroma signals, comprising:
   frequency converting means for converting, in accordance with a local signal, a low range converted chroma signal reproduced from a recording medium to a carrier chroma signal having a phase;
   a comb filter for removing a crosstalk component from the carrier chroma signal output from the frequency converting means;
   phase shifting means for shifting, in response to a controlling signal, the phase of the carrier chroma signal output from the comb filter and outputting a phase-shifted carrier chroma signal;
   variable oscillating means for varying an oscillation frequency in response to the controlling signal and oscillating the local signal, used in the frequency converting means, in accordance therewith; and
   phase detecting means for comparing a phase of a color burst signal of the phase-shifted carrier chroma signal to a phase of a predetermined reference signal and outputting the controlling signal in accordance therewith to control the oscillation frequency of the variable oscillating means in accordance therewith and to control the phase shifting means to control an amount that the phase shifting means shifts the phase of the carrier chroma signal to remove fluctuation in the phase of the carrier chroma signal, introduced by the comb filter, to provide the phase-shifted carrier chroma signal.

2. An automatic phase controlling circuit for processing reproduced chroma signals, comprising:
   frequency converting means for converting, in accordance with a local signal, a low range converted chroma signal reproduced from a recording medium to a carrier chroma signal having a phase;
   a comb filter for removing a crosstalk component from the carrier chroma signal output from the frequency converting means;
   phase shifting means for shifting, in response to a controlling signal, the phase of the carrier chroma signal output from the comb filter and outputting a phase shifted chroma signal;
   variable oscillating means for varying an oscillation frequency in response to the controlling signal and oscillating the local signal, used in the frequency converting means, in accordance therewith;
   first phase detecting means for comparing a phase of a color burst signal of the phase-shifted carrier chroma signal to a phase of a predetermined reference signal and outputting the controlling signal in accordance therewith to control the oscillation frequency of the variable oscillating means; and
   second phase detecting means for comparing the phase a color burst signal of the phase-shifted carrier chroma signal to a phase of a second predetermined reference signal and outputting a second controlling signal in accordance therewith to control the phase shifting means to control an amount that the phase shifting means shifts the phase of the carrier chroma signal to remove fluctuation in the phase of the carrier chroma signal, introduced by the comb filter, to provide the phase-shifted carrier chroma signal.

3. An automatic phase controlling circuit for processing reproduced chroma signals according to claim 1, wherein said frequency converting means comprises:
- a frequency converter for changing a frequency of a low range converted chroma signal to convert the low range converted chroma signal into the carrier chroma signal; and
- a band pass filter for extracting only a predetermined frequency ban from the carrier chroma signal converted by the frequency converter.

4. An automatic phase controlling circuit for processing reproduced chroma signals according to claim 2, wherein said frequency converting means comprises:
- a frequency converter for changing a frequency of a low range converted chroma signal to convert the low range converted chroma signal into the carrier chroma signal; and
- a band pass filter for extracting only a predetermined frequency band from the carrier chroma signal converted by the frequency converter.

5. An automatic phase controlling circuit for processing reproduced chroma signals according to claim 1, wherein the comb filter comprises:
- means for delaying by one horizontal period the carrier chroma signal output from the frequency converting means and outputting a delayed carrier chroma signal; and
- means for combining the delayed carrier chroma signal and the carrier chroma signal.

6. An automatic phase controlling circuit for processing reproduced chroma signals according to claim 2, wherein the comb filter comprises:
- means for delaying by one horizontal period the carrier chroma signal output from the frequency converting means and outputting a delayed carrier chroma signal; and
- means for combining the delayed carrier chroma signal and the carrier chroma signal.

7. An automatic phase controlling circuit for processing reproduced chroma signals according to claim 1, wherein the phase shifting means comprises:
- a band pass filter in which mutual conductances are made variable by a phase controlling voltage.

8. An automatic phase controlling circuit for processing reproduced chroma signals according to claim 2, wherein the phase shifting means comprises:
- a band pass filter in which mutual conductances are made variable by a phase controlling voltage.

9. An automatic phase controlling circuit for processing reproduced chroma signals according to claim 1, wherein the phase detecting means comprises:
- burst gate means for extracting the color burst signal from the carrier chroma signal;
- phase comparing means for comparing the phase of the color burst signal, extracted by the burst gate means, to the phase of the reference signal; and
- a filter for smoothing an output from the phase comparing means and providing the controlling signal in accordance therewith.

10. An automatic phase controlling circuit for processing reproduced chroma signals according to claim 2, wherein said first phase detecting means comprises:
- burst gate means for extracting the color burst signal from the carrier chroma signal;
- phase comparing means for comparing the phase of the color burst signal, extracted by the burst gate means, to the phase of the reference signal; and
- a filter for smoothing an output from the phase comparing means and providing the controlling signal in accordance therewith.

11. An automatic phase controlling circuit for processing reproduced chroma signals according to claim 1, where the variable oscillating means comprises:
- voltage controlled oscillating means for varying the oscillation frequency in response to the controlling signal and outputting an oscillated signal in accordance therewith;
- frequency dividing means for dividing a frequency of the oscillated signal provided by the voltage controlled oscillating means and outputting a frequency divided signal; and
- a phase shifter for shifting by a predetermined amount in each horizontal period, a phase of the frequency divided signal to produce the local signal.

12. An automatic phase controlling circuit for processing reproduced chroma signals according to claim 2, where the variable oscillating means comprises:
- voltage controlled oscillating means for varying the oscillation frequency in response to the controlling signal and outputting an oscillated signal in accordance therewith;
- frequency dividing means for dividing a frequency of the oscillated signal provided by the voltage controlled oscillating means and outputting a frequency divided signal; and
- a phase shifter for shifting by a predetermined amount in each horizontal period, a phase of the frequency divided signal to produce the local signal.

* * * * *